United States Patent [19]

Oku et al.

[11] Patent Number: 4,824,349
[45] Date of Patent: Apr. 25, 1989

[54] APPARATUS FOR CONTROLLING TRANSPORTATION OF CURED TIRES

[75] Inventors: Masaharu Oku, Kodaira; Akio Ohbayashi; Toshiyuki Innami, both of Kuroiso, all of Japan

[73] Assignee: Bridgestone Corporation, Tokyo, Japan

[21] Appl. No.: 129,216

[22] Filed: Dec. 7, 1987

[30] Foreign Application Priority Data

Dec. 8, 1986 [JP] Japan ................................ 61-291750

[51] Int. Cl.$^4$ ........................ B29C 35/02; B07C 5/00
[52] U.S. Cl. .................................. 425/29; 198/349; 209/3.3; 209/587; 425/34.1; 425/135; 425/155
[58] Field of Search ................. 425/28.1, 88, 34.1, 425/38, 144, 157, 156, 162, 29, 135, 155; 198/358, 365, 372, 349, 437, 444, 451, 503, 572; 209/3.3, 587

[56] References Cited

U.S. PATENT DOCUMENTS

| | | | |
|---|---|---|---|
| 1,225,586 | 5/1917 | Cowley | 198/349 |
| 1,566,251 | 12/1925 | Myers | 425/34.1 |
| 2,666,535 | 1/1954 | Dooley | 198/349 |
| 3,895,716 | 7/1975 | Ugo | 198/349 |
| 3,932,079 | 1/1976 | Legostaev et al. | 425/34.1 |
| 3,988,077 | 10/1976 | Naratov et al. | 425/34.1 |

Primary Examiner—Willard Hoag
Attorney, Agent, or Firm—Sughrue, Mion, Zinn, Macpeak & Seas

[57] ABSTRACT

An apparatus for controlling the transportation of cured tires on a tire feed path including a device for supplying a white tire which can be discriminated positively from the cured tires on the tire feed path, a device for placing cured tires on the tire feed path in such an order that the white tire is followed by the cured tires, a photoelectric sensor for detecting the white tire on the tire feed path to generate a reference signal, a memory circuit for storing tire identification signals by means of which the tires have been cured by curing machines, a circuit for reading the tire identification signals out of the memory circuit under the control of the reference signal, and a device for selectively transporting respective cured tires into predetermined paths in accordance with the read out tire identification signals.

14 Claims, 5 Drawing Sheets

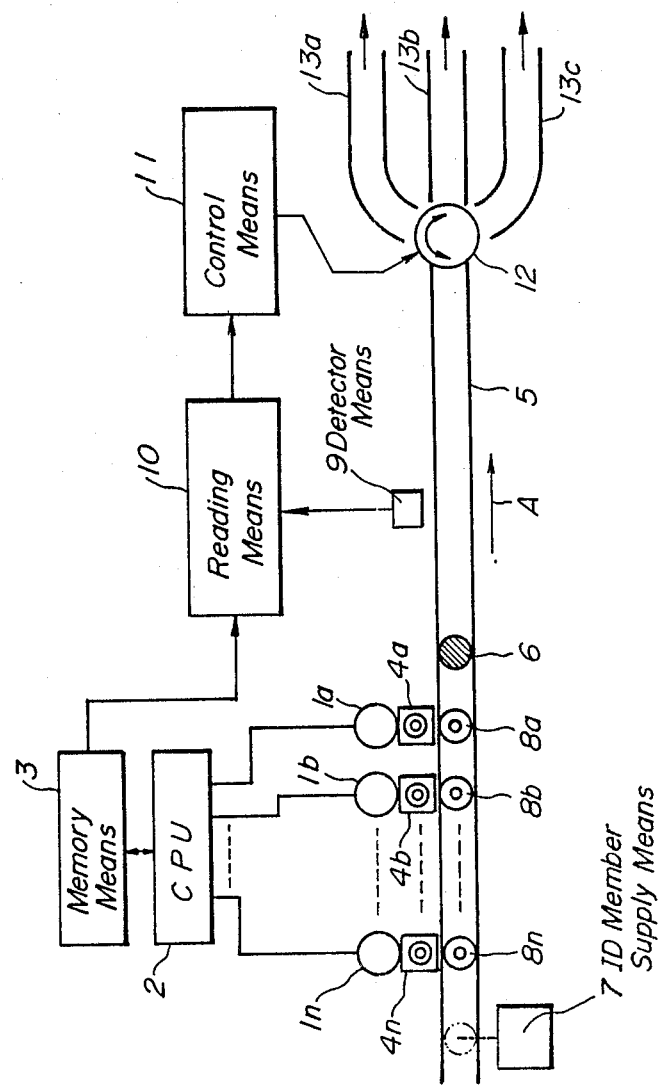

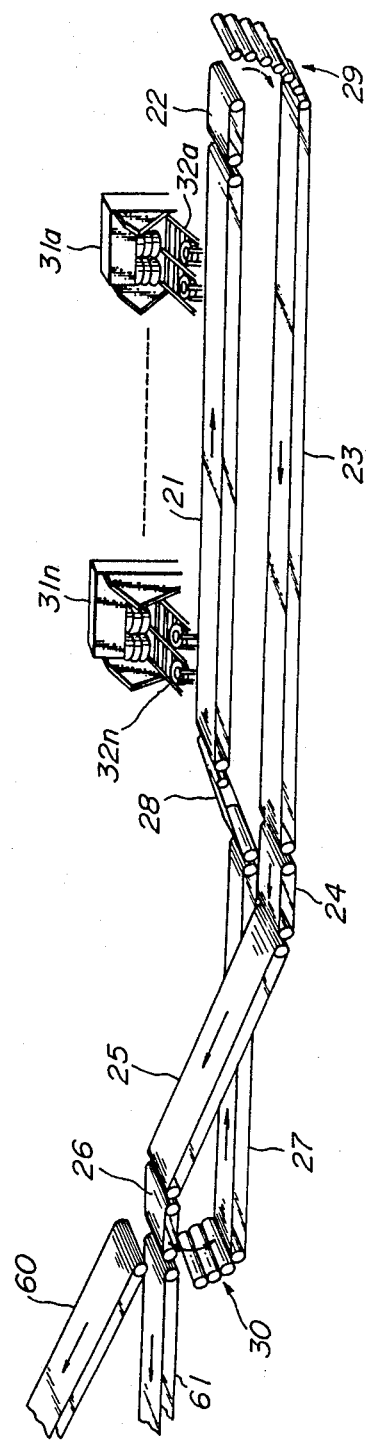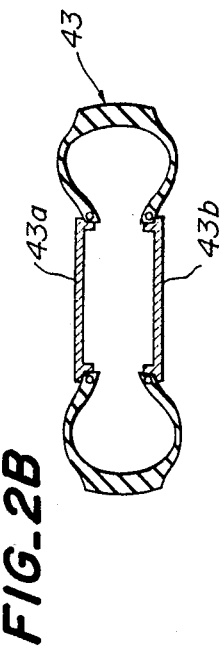

FIG_3
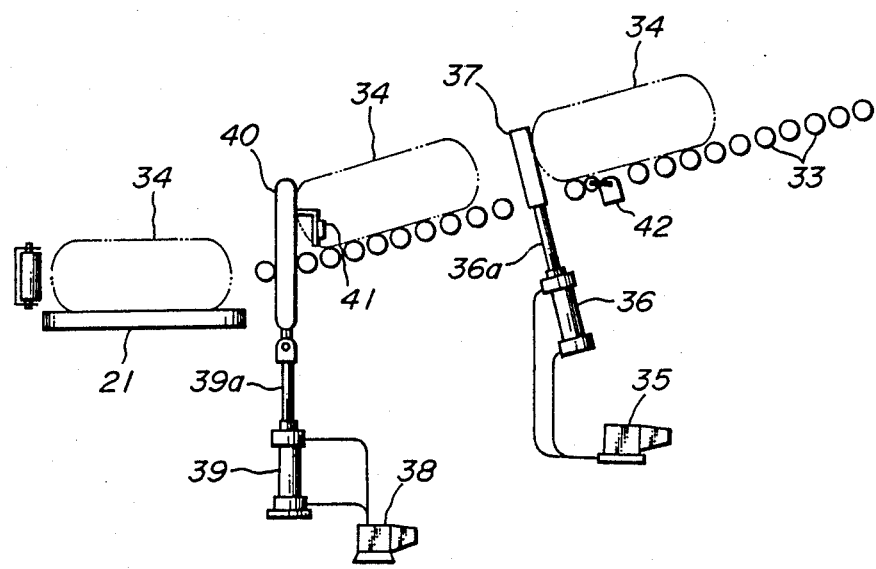

APPARATUS FOR CONTROLLING TRANSPORTATION OF CURED TIRES

BACKGROUND OF THE INVENTION

Field of the Invention and Related Art Statement

This invention relates to an apparatus for controlling the transportation of cured tires in a tire manufacturing factory and more particularly to a method of identifying cured tires transported on a tire feeding path after curing machines without detecting tire identification information from the tires.

In the tire manufacturing process, cured tires are subjected to a finishing process and a checking process. In this case, it is required to detect the cured tires transported on a feeding line and direct respective cured tires to given finishing stages and checking stages. To this end, tire identification information such as kinds, outer appearance, dimensions and shapes of tires are detected from the tire itself. The tire identification information may be detected by various methods. For instance, the outer appearance of tire is detected by detecting tread pattern, identification line, limb diameter, width and outer diameter of tire. It is also known to enter manually the tire identification information which is detected by an operator watching the tire.

The above mentioned tire identification information detecting methods have drawbacks which will be explained hereinafter.

The tire diameter or tire width is detected by a pair of photoelectric switches arranged along a tire transporting path by interposing a predetermined distance therebetween. In this case, it is only determined whether a diameter or width of a tire is larger than the predetermined distant or not. Therefore, by means of such a method, it is possible to distinguish only a few kinds of tires, and thus the known method could not comply with the recent needs in which many kinds of tires are required to be processed.

In the method of identifying the tires in accordance with the limb diameter, the limb diameter is measured with the aid of a photosensor. However, there are many different kinds of tires having the same limb diameter, and these tires could not be distinguished from each other.

In the method of identifying the tire by taking an image of a tread pattern of the tire by means of a television camera and by processing an image signal supplied from the television camera, an image of the crown portion of the tire is picked up by the television camera and the tire is identified by the so-called pattern recognition. However, this method has drawbacks that the pattern could not be recognized accurately and the processing speed is low. Moreover, different kinds of tires may have the same solid pattern and such tires could be no more classified.

In the method of classifying tires by reading out color lines recorded on the crown portion of the cured tire with the aid of a color sensor, color and thickness of lines and distance between lines may be utilized as judgement standards. However, the color lines could not be recorded on the tire accurately, and hue of color and thickness and position of color lines on the tire might be fluctuate. Therefore, the tire identification information could not be recorded on the tire in an accurate manner. Further, the speed of processing is rather slow.

As explained above in detail, in the known methods of detecting the tire identification information, the detection accuracy is low, the detection speed is slow, and a sufficient amount of information could not be obtained. Particularly, a variety of needs for tires has manifested, and tires having the same dimension, appearance and tread pattern have to be finished differently from each other. That is to say, in the final finishing process, shoulders of tires have to be subjected to different final finishing processes. In such a case, it is almost impossible to control the transportation of the cured tires by means of the tire identification information detected from the tires themselves.

SUMMARY OF THE INVENTION

The present invention has for its object to provide a novel and useful apparatus for controlling the transportation of cured tires without using the identification information detected from the cured tires.

According to the invention, an apparatus for controlling the transportation of a plurality of tires cured by a plurality of curing machines comprises:

means for storing tire identification information of a plurality of cured tires;

means for placing the cured tires in a predetermined order on a tire feed path, the tire identification information of said cured tires being stored in said storing means;

means for placing an identification member on said tire feed path such that said plurality of cured tires placed on the tire feed path can be identified as a group;

means for detecting said identification member placed on the tire feed path to generate a reference signal;

means for reading the tire identification information out of said storing means in accordance with the reference signal; and means for controlling the transportation of respective cured tires in the group supplied on the tire feed path in accordance with the read out tire identification information.

BRIEF DESCRIPTION OF THE DRAWINGS

FIG. 1 is a schematic view showing a principal construction of the tire transportation controlling apparatus according to the invention;

FIGS. 2A and 2B are a perspective view illustrating an embodiment of the tire transportation controlling apparatus according to the invention and a cross sectional view of the white tire;

FIG. 3 is a side view depicting the gate mechanism;

DESCRIPTION OF THE PREFERRED EMBODIMENTS

Figure 4:
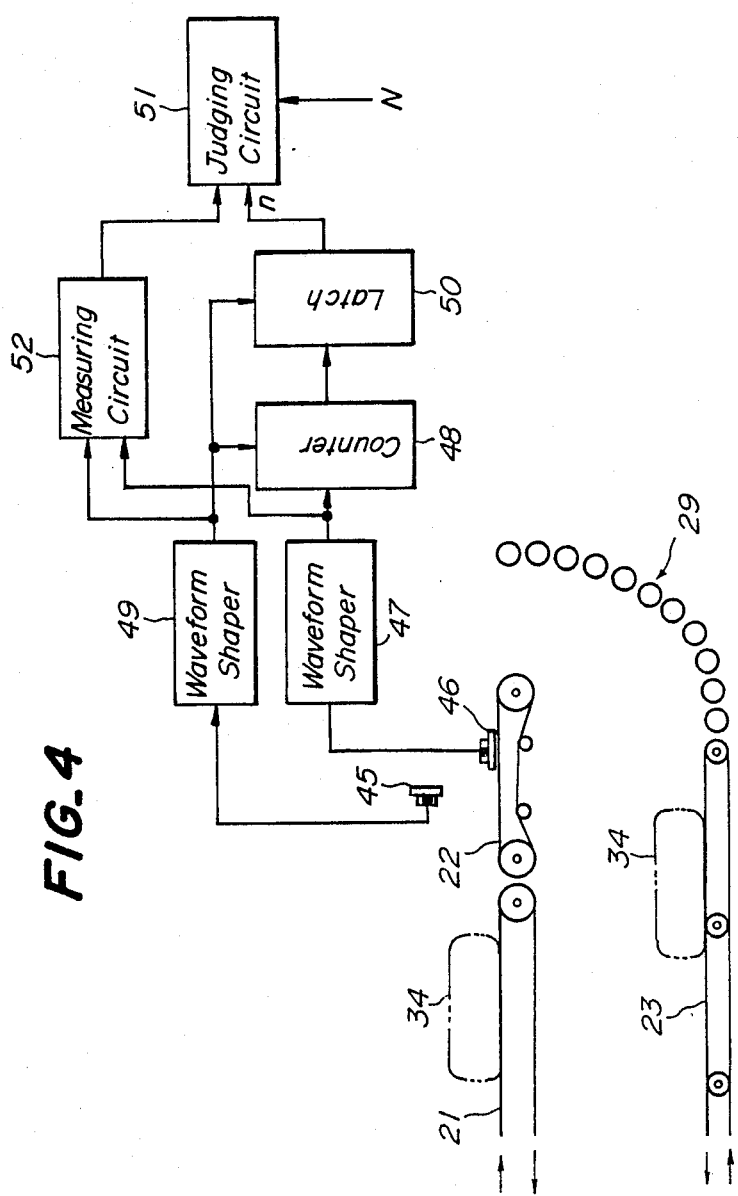
FIG. 4 is a schematic view showing the construction relating to the conveyor.

FIG. 1 is a schematic view showing a basic construction of the tire transportation controlling apparatus according to the invention. A plurality of curing machines $1a$, $1b$, ... $1n$ are controlled by a central processing unit (CPU)2 so that predetermined kinds of tires are cured by the curing machines. Tire identification information of tires cured by the machines $1a$, $1b$ ... $1n$ has been previously stored in a storing means 3. Therefore, it is always known that what kind of tire is cured in which curing machine. The tires cured by the curing machines 1a, 1b ... 1n are taken out of the machines and are then fed into post cure inflators (PCI) 4a, 4b ... 4n, respectively. In PCI the cured tire is inflated and is cooled down. After that the cured and cooled tires are placed on a tire feed path 5 composed of, for example, an endless belt conveyor and are transported in a direction shown by an arrow A into a finishing stage and checking stage. According to the invention, there is provided a means 7 for placing an identification member 6 on the tire feed path 5 at a given position thereon such that the cured tires 8a, 8b ... 8n placed on the tire feed path 5 can be classified as a group. Therefore, as illustrated in FIG. 1, on the tire feed path 5, the identification member 6 is followed by the cured tires 8a, 8b ... 8n successively. It should be noted that it is not always necessary to place the cured tires supplied from the successive PCIs 4a, 4b ... 4n in this order. That is to say, the front cured tire 8a may be a tire supplied from other PCI than the first PCI 4a. However, it is preferable that the cured tires 8a, 8b ... 8n are supplied from PCIs 4a, 4b ... 4n, respectively.

In the tire feed path 5, there is arranged a means 9 for detecting the identification member 6 to generate a reference signal. The reference signal thus generated is supplied to a reading means 10 which reads out of the memory means 3 the tire identification information of the cured tires 8a, 8b ... 8n following the identification member 6. The tire identification information thus read out is supplied to a feed control means 11 which controls a tire feeding direction change-over means 12 provided in the tire feed path 5 in accordance with the tire identification information so that successive cured tires 8a, 8b ... 8n are selectively supplied into given feed paths 13a, 13b and 13c.

As explained above, according to the present invention, the tire identification information is not detected from the cured tires, but the tire identification information which have been already given for the curing process are stored in the memory means 3, the cured tires 8a, 8b ... 8n and the identification member 6 are placed on the tire feed path 5 in such a manner that the cured tires can be classified as the group by the identification member 6, then the tire identification information of the cured tires 8a, 8b ... 8n are read out of the memory means 3, and the transportation of the cured tires is controlled by the thus readout tire identification information. Therefore, the useful tire identification information can be attained in an accurate and prompt manner, so that the tire transportation can be controlled in a very reliable manner. Further, the cured tires are divided into the group by means of the identification member 6, so that even if tires in a certain group could not be identified correctly, tires in a next group could be classified in a correct manner. That is to say, in the apparatus according to the invention, an error which might occur in processing tires in a group does not affect the control of tires in following groups.

FIG. 2A is a perspective view showing the entire construction of an embodiment of the tire transportation controlling apparatus according to the invention. In the present embodiment, the tire feed path is composed of eight conveyors 21~28, each being made of endless belts and two feed direction change-over roller units 29 and 30, each being composed of a plurality of rollers. Along the conveyor 21 are arranged a plurality of curing machines 31a, 31b ... 31n and post cure inflators 32a, 32b ... 32n. After curing, tires are sent to PCIs and are cooled, while the tires are inflated. Then, the tires are transported on the conveyor 21 at a suitable timing. To this end, gate mechanisms are provided between PCIs 32a, 32b ... 32n and conveyor 21.

FIG. 3 shows the detailed construction of the gate mechanism. A cured tire 34 is supplied from the curing machine via a roller conveyor 33 and is forcedly stopped by a stopper 37 which is coupled with a plunger 36a of a cylinder 36 driven by an electromagnetic valve 35. After the cured tire 34 is stopped in the above explained manner, the post cure inflator is actuated and the cured tire is inflated. After the inflated tire 34 is cooled for a predetermined time period, the post cure inflator is removed from the tire. Next, the electromagnetic valve 35 is actuated to move the plunger 36a of the cylinder 36 downward and the stopper 37 is retired from the tire traveling path. Then the tire 34 is moved leftward in FIG. 3 due to the gravitational force until it is urged against a stopper 40 connected to a plunger 39a of a cylinder 39 which is driven by an electromagnetic valve 38. Just in front of the stopper 40 there is provided a photoelectric switch 41 which judges whether the tire is correctly fed or not. That is to say, after a limit switch 42 provided in front of the stopper 37 has been actuated by the tire 34, when the photoelectric switch 41 detects the tire within a predetermined time after the electromagnetic valve 35 is actuated and the stopper 37 is removed from the passage of the tire, it can be judged that the tire has been fed correctly. To the contrary, when the photoelectric switch 41 does not detect the tire within the predetermined time, it can be assumed that the tire is not fed correctly due to any abnormality.

When the tire 34 is judged to be transported correctly, the electromagnetic valve 38 is actuated at a suitable timing to drive the cylinder 39 and the stopper 40 is removed from the tire feed passage. Then the tire 34 is dropped on the conveyor 21. At the same time, an identification signal of the relevant tire is stored in a memory. In this manner, the cured tires supplied from the curing machines 31a, 31b ... 31n are supplied on the conveyor 21 and tire identification signals are stored in the memory together with information about the order in which the tires are placed on the conveyor 21.

As explained above, according to the invention a series of tires placed on the conveyor 21 are classified into a single group with the aid of the identification member. In the present embodiment, as illustrated in FIG. 2B the identification member is formed by a dummy tire 43 which has white discs 43a and 43b clamped in the bead portions on respective sides of tire. Hereinafter, this identification member is called "white tire". In order to use the white tire 43 repeatedly, the feeding path is formed as an endless one. Further, in order to place the white tire 43 on the conveyor 21 at a suitable timing, there is provided the conveyor 28 which is selectively driven when the white tire is to be transported onto the conveyor 21. At a suitable timing, the conveyor 28 is driven and the white tire 43 fed on the conveyor 28 is transported onto the conveyor 21. After the white tire 43 has been placed on the conveyor 21, the stoppers 40 of the gate mechanisms are retired at suitable timings so that the cured and cooled tires are placed on the conveyor 21 in a given order, while the white tire is placed at a position preceding a series of cured tires. In this manner, the cured tires placed on the conveyor 21 are classified into a group with the aid of the white tire and the tire identification signals of these tires can be traced accurately in accordance with the order of tires in the group. In the actual tire manufacturing process, some cured tires are extracted from the conveyor and replaced on the conveyor, so that the order of arrangement might be disturbed. If the tires are not classified into the group by means of the white tire, the once disturbed order of tires arranged on the conveyor would last permanently. In order to avoid such a permanent disturbance, the white tire is provided and a series of cured tires are classified into a group. Then, even if the order of tire arrangement in a group is disturbed, the error is restricted within the relevant group and the tire identification information for succeeding groups can be obtained correctly. Further, the classification of tires is effected by simply inserting the white tire, any trouble does not occur although the conveyors are stopped.

After the cured tires have been placed on the conveyor 21 together with the white tire, the tires are fed into the next conveyor 22.

FIG. 4 is a schematic view showing the detailed construction of parts relating to the conveyor 22. The travelling speed of the conveyor 22 is higher than that of the conveyor 21, so that on the conveyor 22 the distances between successive tires are prolonged such that succeeding processes are facilitated. Above the conveyor 22 are arranged a first photoelectric switch 45 for exclusively detecting the white tire and a second photoelectric switch 46 for detecting the cured tires. As shown in FIG. 2B, the white tire 43 comprises the white disc 43a clamped in the bead portion, and the photoelectric switch 45 is constructed to detect the white disc. An output signal from the photoelectric switch 46 is shaped by a waveform shaper 47 and then is supplied to a counter 48. To a reset input of the counter 48 is supplied a signal generated by the photoelectric switch 46 via a waveform shaper 49. Therefore, the counter 48 is reset by the white tire and counts the cured tires following the white tire. When the white tire is detected again, the count value of the counter 48 is supplied to a latch circuit 50 and the counter is reset again.

In the manner explained above, the number of cured tires n in a group classified the white tire 43 is counted by the counter 48 and the thus counted value n is supplied to a judging circuit 51 via the latch 50. To the judging circuit 51 is also supplied from the central processing unit the number of cured tires N supplied on the conveyor 21 and these numbers n and N are compared with each other in the judging circuit 51. When n=N, it can be judged that all the cured tires supplied on the conveyor 21 have been correctly transported onto the conveyor 22. When n>N, it is judged that at least one non-identified cured tire has been added to the group classified by the relevant white tire. In the actual tire manufacturing process, a cured tire is occasionally removed from the line and is returned on the line afterward. In the present embodiment, it is predetermined that the occasionally removed tire should be placed on the line after the last cured tire in the group. Then, in the case of n>N, only the added tire could not be identified, but the identification signals of the remaining tires in the relevant group can be obtained correctly. To this end, the tire detection signals generated by the photoelectric switches 45 and 46 are supplied to a measuring circuit 52 via the waveform shapers 47 and 49, respectively and distances between successive tires are detected. The measurement of the tire distance can be effected precisely by counting clock pulses having a constant frequency for time periods between successive tire detection signals. When n>N is detected, a distance d between the last tire in a group and the next coming white tire for classifying a next group is compared with a standard distance D which has been previously set in the judging circuit 51. In the case of d<D, it is judged that the additional tire has been correctly supplied after the last cured tire in the group and the identification signals obtained for the cured tires in this group can be used correctly. On the contrary, in the case of d≧D, the additional tire has been erroneously inserted among the cured tires in the group and the identification signals for all the cured tires in this group are judged to be erroneous.

If the number of detected tires n is smaller than the standard value N (n<N), it is judged that one or more tires have been withdrawn from the relevant group and all the tires are judged to be not identified.

As explained above, by detecting the number of tires in the group it is possible to determine whether or not the identification of tires in the relevant group could be performed correctly. Therefore, the tire identification can be carried out effectively and precisely.

The tire fed by the conveyor 22 is turned by the feed direction change-over roller unit 29 and then is transferred onto the conveyor 23. As shown in FIG. 2A, the tire on the conveyor 23 is further transported by the conveyors 24 and 25 and then is fed onto the conveyor 26.

Figure 5:
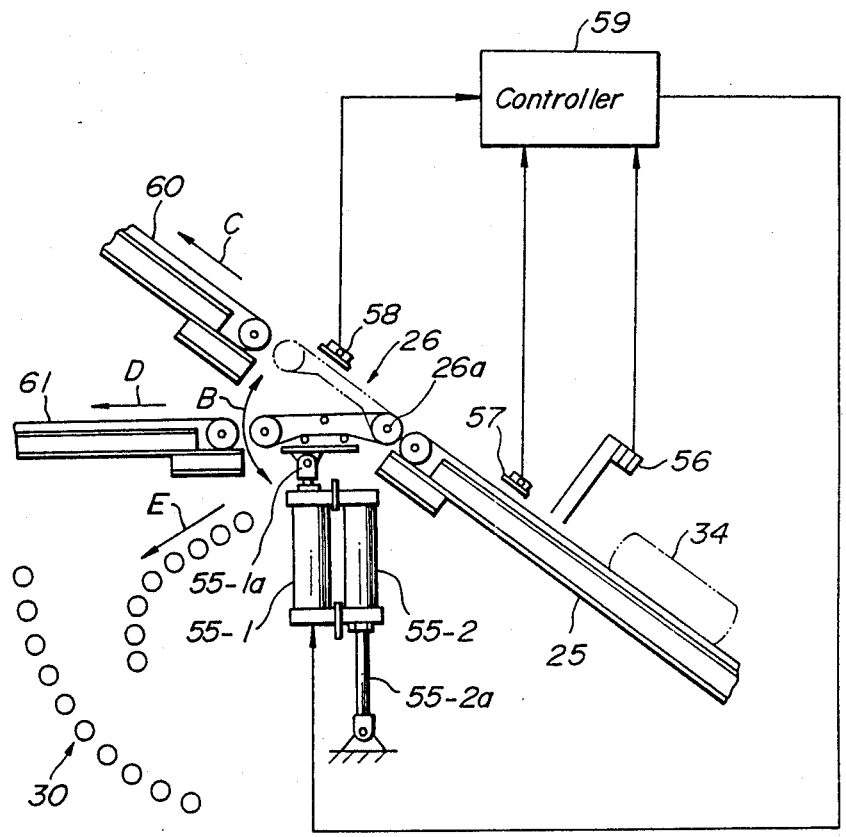
FIG. 5 is a schematic side view of the swingable conveyor.

FIG. 5 is a schematic view showing the construction of the conveyor 26. The conveyor 26 is journalled about a shaft 26a and is moved swingably as shown by an arrow B by means of cylinders 55-1 and 55-2. A plunger 55-1a of the cylinder 55-1 is connected to the conveyor 26, the cylinders 55-1 and 55-2 are coupled with each other and a plunger 55-2a is connected to a fixed base member. Above the conveyor 25 there are arranged a reflection type photoelectric switch 56 for detecting the white tire and a transmission type photoelectric switch 57 for detecting the cured tires. Above the swingable conveyor 26 there is arranged a photoelectric switch 58 for confirming the passage of tires. Output signals from these photoelectric switches 57 and 58 are supplied to a controller 59. The controller 59 discriminates the white tire from the cured tires and detects the order of the cured tires. Then the tire identification signals which have been previously stored in the memory circuit are read out and controls the cylinders 55-1 and 55-2 to move the conveyor 26 into one of three positions. When tire on the conveyor 26 is the white tire, the conveyor is moved into the lowermost position, and the white tire is supplied into the feed direction change-over roller unit 30 as shown by an arrow E. The white tire is further fed by means of the conveyor 27 onto the conveyor 28 and is remained thereon. At a suitable timing, the white tire on the conveyor 28 is fed onto the conveyor 21. In this manner, the white tire is used repeatedly. The cured tires following the white tire are selectively fed into a passage C or D in accordance with the tire identification signals related to respective cured tires, and are further transported by conveyors 60 and 61 into given processing stages. It should be noted that the photoelectric switch 56 for detecting the white tire comprises two sets of detector arrays each including three detectors, and when two or more than two detectors among the three detectors in each set detect the white tire, the detected tire is judged to be the white tire. Further, since the photoelectric switch 57 for counting the number of tires requires the positive operation, when the output signal from the photoelectric switch changes from the off-condition to the on-condition, the counting up operation is performed, while the operational condition of the conveyors is also taken into account. Therefore, when the conveyors are stopped and the tires slide backward, the counting operation is not carried out. In this manner, the positive operation for detecting the tires can be enhanced.

The present invention is not limited to the embodiment so far explained, but many modifications and alternations may be conceived by those skilled in the art within the scope of the invention.

In the embodiment explained above, the identification member is constituted by the white tire having the white discs clamped within the bead portions, but it is not always necessary to use the tire as the identification member and it may be constituted by any other members which can be positively distinguished from the cured tires. However, it is preferable to use the tire like identification member which can be handled by the conveying means easily. Further, in the above embodiment the tire travelling path is formed endless so that the white tire can be used repeatedly, but it is not always necessary to construct the tire travelling path as the endless one.

Moreover, in the above embodiment, the white tire for classifying the tire group is followed by the cured tires and the counter for counting the tires is reset by the detection signal of the white tire, but the white tire may be placed after the tire group. In such a case, the counter may be reset by the timing pulse for supplying the tires onto the travelling path. Further, two identification members may be provided at the front and rear positions of the group.

Further, the conveyors are driven, for instance for four minutes and cured tires in a group are transported and then the conveyors are stopped for one minute. This cycle is repeated for successive tires. In this case, the number of tires and arranging order of tires in the group may be checked by taking into account of the driving condition of the conveyors.

As explained above in detail, in the tire transportation controlling apparatus according to the invention, the transportation of tire is controlled not by detecting the tire identification information from the tire itself, but by utilizing the tire identification information which has been previously given for the curing process. Therefore, much more accurate information about the tire can be obtained and the tire transportation can be controlled in a positive, precise and reliable manner. Further, the predetermined number of cured tires supplied on the feeding path are classified into a group by means of the identification member, so that even if an identification error might occur in a group, the error is restricted in the relevant group and is not continued into following groups. Therefore, the identification of tire can be performed very reliably.

What is claimed is:

1. Apparatus for curing tires, comprising: plural tire curing machines, means for conveying cured tires from said machines; means for storing tire identification information for plural different kinds of tires; means for placing cured tires in a predetermined order on said means for conveying;

means for placing an identification member on said conveying means such that a plurality of said cured tires are classifiable as a group thereby;

means for detecting said identification member placed on said conveying means and for generating an identification signal according to the classification of said group;

means for reading tire information out of said storing means; and means for controlling the transportation of said group of tires on said means for conveying in accordance with tire information read from said storing means and said identification signal.

2. An apparatus according to claim 1, wherein said means for storing the tire identification information comprises means for storing tire identification signals for identifying respective tires and for controlling curing of said tires in said curing machines.

3. An apparatus according to claim 1, wherein said identification member placing means comprises means for placing a tire like member which can be distinguished from the cured tires.

4. An apparatus according to claim 3, wherein said tire like member is formed by a tire having white discs each clamped in bead portions of the tire.

5. An apparatus according to claim 3, wherein said tire feed means formed as an endless tire conveyor.

6. An apparatus according to claim 5, wherein said endless tire conveyor means comprises a first conveyor means arranged along a plurality of curing machines and having inlet and outlet, a first roller unit arranged at the outlet of the first conveyor means for turning the feeding direction of tires, a second conveyor means having an inlet arranged near the first roller unit and an outlet, a third conveyor means having an inlet arranged near the outlet of the second conveyor means and an outlet, a second roller unit arranged at the outlet of the third conveyor means for turning the feeding direction of tires, a fourth conveyor means having an inlet arranged near the second roller unit and an outlet, and a fifth conveyor means having an inlet arranged near the outlet of the fourth conveyor means and an outlet arranged near the inlet of the first conveyor means, whereby said fifth conveyor means is selectively driven such that the tire like member is supplied onto the first conveyor means at a suitable timing.

7. An apparatus according to claim 6, wherein said suitable timing is set such that the tire like member is placed on the first conveyor means at such a position that the tire like member is followed by cured tires in a group.

8. An apparatus according to claim 6, wherein said first conveyor means comprises a first conveyor movable at a first speed and a second conveyor arranged after the first conveyor and moving at a second speed which is higher than said first speed, so that distances between successive tires placed on the first conveyor are prolonged.

9. An apparatus according to claim 6, wherein said third conveyor means comprises a first conveyor and a second swingable conveyor which is driven in accordance with the tire identification information.

10. An apparatus according to claim 1, wherein said means for placing the cured tires on the tire feed means comprises gate mechanisms each arranged between respective said curing machines and the tire feed path for selectively supplying the cured tires on the tire feed path.

11. An apparatus according to claim 10, wherein said gate mechanisms are arranged between post cure inflators arranged to receive cured tires supplied from the curing machines and the tire conveyor means.

12. An apparatus according to claim 3, wherein said means for detecting the tire like member comprises first sensor for detecting the tire like member to generate a first signal, a second sensor for detecting the cured tires to generate a second signal, and a signal processing means for processing said first and second signals to generate said reference signal.

13. An apparatus according to claim 12, wherein said signal processing means comprises a counter which counts said second signal and is reset by said first signal, a latch for storing a count value n of said counter at the time that the counter is reset, and a judging circuit for comparing said count value n with a predetermined value N.

14. An apparatus according to claim 13, wherein said signal processing means further comprises a measuring circuit for receiving said first and second signals and measuring a distance d between the last tire in a group and a next coming tire like member for classifying a next group, and said judging circuit is constructed such that when $n>N$, said distance d is compared with a predetermined standard distance D and identification information is judged to be valid only when $d<D$.

* * * * *